Figure 1:
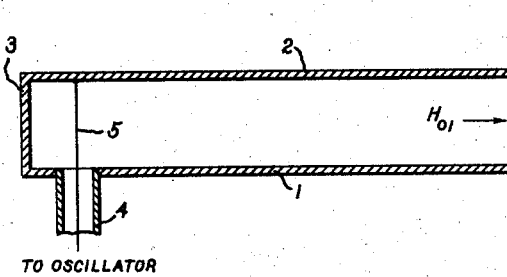

Sept. 3, 1946. M. D. FISKE ET AL 2,407,068
WAVE TRANSMITTING SYSTEM
Filed Sept. 15, 1942 2 Sheets-Sheet 1

Inventors:
Milan D. Fiske,
James M. Lafferty,
by Harry E. Dunham
Their Attorney.

Inventors:
Milan D. Fiske,
James M. Lafferty,
by Harry E. Dunham
Their Attorney.

Patented Sept. 3, 1946

2,407,068

UNITED STATES PATENT OFFICE 2,407,068

WAVE TRANSMITTING SYSTEM

Milan D. Fiske, Schenectady, and James M. Lafferty, Colonie, N. Y., assignors to General Electric Company, a corporation of New York Application September 15, 1942, Serial No. 458,422

22 Claims. (Cl. 250—11)

Our invention relates to the transmission of electromagnetic waves, and more particularly relates to the transmission of ultra high frequency electromagnetic waves through metallic guides. In addition, our invention relates to a system wherein electromagnetic waves are guided dielectrically through a hollow pipe-like member and in which the energy of the wave is reflected in a desired direction.

It is now quite well appreciated that electromagnetic waves may be propagated through the interior of a metallic member or pipe of conductive material which contains a dielectric medium, such as air or a gas, if the frequency of the exciting electromagnetic waves is greater than a critical minimum frequency. This critical minimum frequency is established by the dimensions of the pipe, principally the transverse dimensions.

In accordance with the teachings of our invention described hereinafter, we provide a new and improved wave guide wherein electromagnetic waves are propagated dielectrically and wherein the waves are concentrated in a manner to obtain an evenly distributed radiated wave throughout a predetermined region determined by a reflecting surface.

It is an object of our invention to provide a new and improved wave guide.

It is another object of our invention to provide a new and improved wave guide whereby electromagnetic waves are transmitted dielectrically through a hollow pipe member.

It is a further object of our invention to provide an improved means in a dielectric guide wherein predetermined components of the electromagnetic field may be accentuated for the purpose of facilitating concentrated radiation of the wave energy.

It is a still further object of our invention to provide a new and improved means in connection with a dielectric wave guide wherein the voltage gradient established by a electromagnetic field may be concentrated for the purpose of obtaining an evenly distributed directed wave through the use of associated reflecting means.

In accordance with our invention, we provide improved radiative systems to be used in conjunction with dielectric wave guides wherein a conductive wall member having its plane substantially perpendicular to the direction of wave propagation within the guide is provided with a resonant aperture to effect a concentration of the potential due to the electromagnetic field, or an increase in the voltage gradient whereby a variable dipole is established for radiation purposes. The aperture in the conductive wall is provided with an appreciable dimension which is perpendicular to the direction of propagation and to the electric component of the electromagnetic wave which is transmitted through the guide, thereby establishing a high potential gradient within the immediate vicinity of the aperture causing a localized flow of current through the wall to produce a dipole. In some modifications of our invention, the aperture is of an elongated nature having the principal dimension perpendicular to the electric component of the wave. By dimensioning the aperture relative to the dimensions of the guide and the wave length of the wave which excites the guide, the aperture is made resonant to the exciting wave.

Briefly stated, in the illustrated embodiments of our invention we provide means for increasing the potential gradient of an electromagnetic wave which is transmitted through a hollow-pipe type wave guide wherein the energy is transmitted dielectrically. A wall member or metallic plate is positioned relative to the pipe so that the plane thereof is substantially perpendicular to, or having a component perpendicular to the longitudinal axis of the pipe or perpendicular to the direction of propagation of the wave through the pipe. The wall member or plate is provided with an aperture, preferably elongated and which may be of rectangular shape, and which is tuned to the frequency of the source of electromagnetic waves which excite the guide. The metallic wall member accentuates or concentrates the potential of the field incident to the wave and consequently provides a ready means for extracting the energy of the wave and directing it in a predetermined direction. A reflecting surface, such as a metallic paraboloid, may be employed for the purpose of evenly distributing the radiated electromagnetic energy within a well defined region determined by the curvature of the reflecting surface. By positioning the radiative element or the slot relative to the focal point of the paraboloid, the desired even distribution of the reflected wave in a restricted region is readily obtained.

Figure 1A:
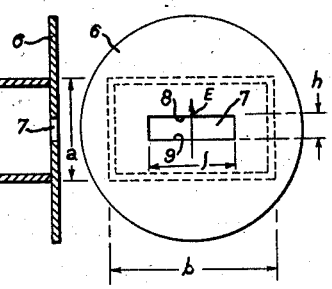
Figure 2:
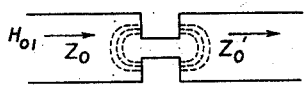
Figure 3:
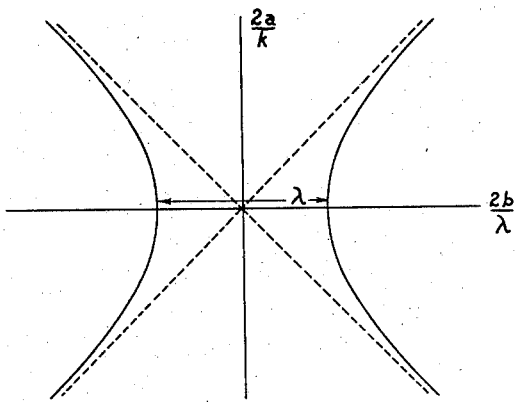
Figure 4:
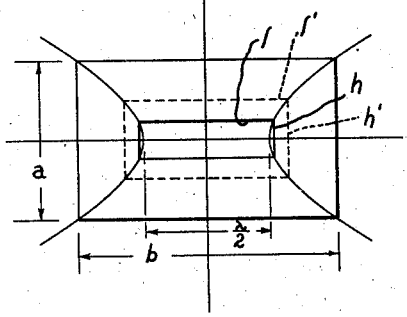
Figure 5:
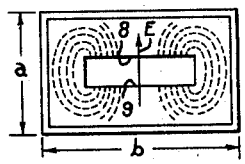
Figure 6:
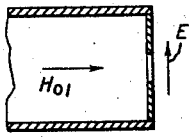
Figure 7:
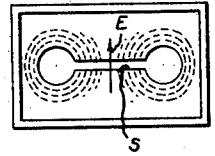
Figure 8:
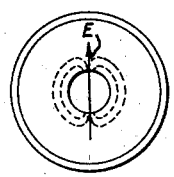
Figure 9:
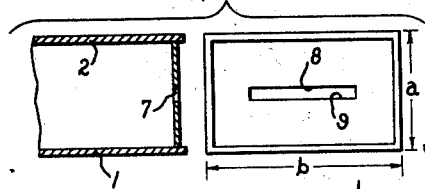
Figure 10:
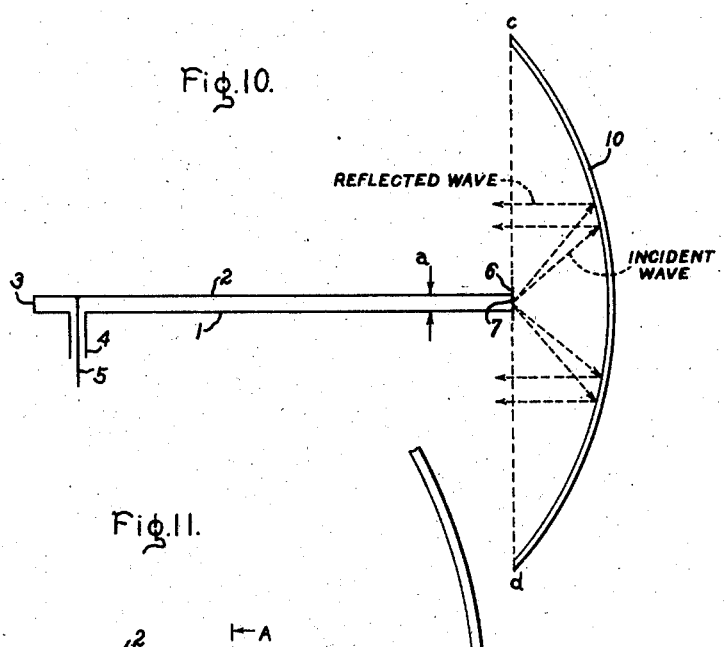
Figure 11:
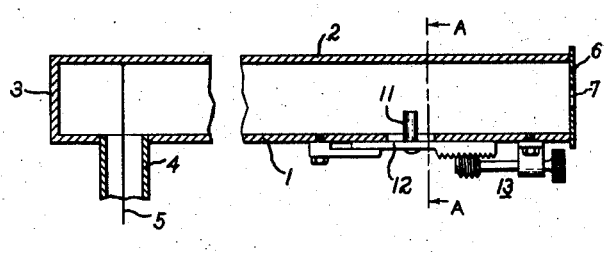
Figure 12:
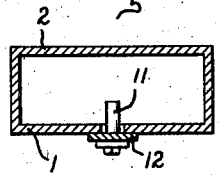
Figure 13:
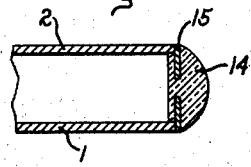

For a better understanding of our invention, reference may be had to the following description taken in connection with the accompanying drawings, and its scope will be pointed out in the appended claims. Fig. 1 diagrammatically illustrates an embodiment of our invention as applied to a metallic wave guide. Fig. 1a is a detailed view of the radiative element attached to the end of the guide or pipe. Fig. 2 represents some of the considerations to be borne in mind relative to the phenomena of the radiative element. Fig. 3 shows the loci of the corners of a rectangular slot or slit, and Fig. 4 represents the manner in which the dimensions of the resonant slot or slit vary for a rectangular wave guide. Figs. 5 and 6 show the manner in which a rectangular slot produces a virtual dipole. Fig. 7 represents a modified form of aperture wherein circular openings are present at the ends of a narrow slit, and Fig. 8 represents a still further embodiment wherein the aperture is circular. Fig. 9 illustrates an arrangement wherein the wall including the aperture is placed within the guide a short distance from the end thereof. Fig. 10 diagrammatically illustrates an embodiment of our invention as applied to a system wherein the wave guide, the radiative element, and a reflecting surface are employed. Fig. 11 diagrammatically illustrates a further embodiment wherein reflecting means are employed within the guide in order to compensate for the effect incident to any reflected energy caused by the presence of the reflected surface; and Fig. 12 is a cross sectional view of Fig. 11. Fig. 13 illustrates the manner in which the wall member including the aperture may be provided with insulating means or a material of high dielectric strength to permit the transmission of a relatively large amount of power through the radiative element.

Prior to the detailed discussion of our present invention as applied to wave guides wherein electromagnetic energy is transmitted dielectrically, it is believed that it may be helpful to review generally certain aspects of the phenomena associated with the propagation of electromagnetic waves through guides. As is well appreciated, wave guides of this nature may be employed for the transmission and propagation of electromagnetic waves of a variety of forms or character. These waves have been generally indicated heretofore as being of the E and H types. Subscripts as indicated, $E_{n,m}$ and $H_{n,m}$, have been assigned to these waves in order to indicate the nature of the waves, where $n$ represents the order of the wave and $m$ represents the mode of propagation. The order of the wave is determined by the manner in which the field intensity varies circumferentially around the axis of the guide, whereas the mode is determined by the manner of its variation with radial distance from the axis of the guide. The E type waves have both a longitudinal and a transverse component of electric field but only a transverse component of magnetic field. The H type waves have both a longitudinal and a transverse component of magnetic field but only a transverse component of electric field. Although our invention is applicable to systems for the transmission of a great variety of waves of both the E and H types, in describing our invention hereinafter reference will be made particularly to the $H_{01}$ type of wave.

It is also appreciated that in pipes for dielectrically guiding waves each configuration of the pipes establishes a critical minimum frequency below which energy is not propagated through the guide. Stated in other words, for frequencies below this critical frequency, the wave is rapidly attenuated so that energy cannot be transmitted through the guide. Above the critical frequency, the wave is propagated in the desired direction and the wave assumes a time-space distribution through the guide established principally by the wave length of the exciting impulses for the guide and the transverse dimensions of the guide.

Referring now more particularly to Fig. 1 of the accompanying drawings, we have there illustrated our invention as applied to a hollow-pipe type guide wherein electromagnetic waves are transmitted or propagated dielectrically. It is to be appreciated that the transverse dimensions of the hollow pipe may be of a variety of configurations, and for the purpose of illustrating our invention we have chosen to represent a pipe having a substantially rectangular cross section. The guide may comprise metallic enclosing walls constructed of a conductive medium, such as copper or brass, and may include a base plate 1, a top plate 2, an end wall 3, and side walls (shown in Fig. 1a) all of which are conductively connected. The dimensions $a$ and $b$, the depth and height of the guide, the dielectric constant of the medium within the guide, and the wave pattern, determine principally the critical frequency of the guide. The dielectric medium through which the electromagnetic energy is transmitted may be considered as being air or a gas. Of course, the waves may also be satisfactorily transmitted through an evacuated space.

We provide means for establishing within the interior of the wave guide electromagnetic waves. The excitation of the guide may be effected in a variety of ways now well appreciated by those skilled in the art, and we have chosen to illustrate this means as comprising a concentric or coaxial transmission line comprising a metallic tube or cylinder 4 and a conductor 5, the former of which is conductively connected to the base plate 1 and the latter of which is conductively connected to the top plate 2. It will be appreciated that in order to effect the desired establishment of waves within the guide, that the cylinder 4 and conductor 5 need not be connected to the exact places stated. It is desired to make these connections at the points which will establish the greatest field gradient for the most effective excitation of the guide. Cylinder 4 and conductor 5 may be connected to a source such as an oscillator or generator (not shown) of ultra high frequency energy.

We provide a radiative wall element, such as a metallic disk 6, the plane of which is substantially perpendicular to the longitudinal axis of the guide and which may be placed to abut the end of the guide. The plate 6 may be constructed of copper or silver and is, of course, conductive. In order to concentrate the potential at the end of the pipe incident to the electromagnetic field which is propagated therethrough, we provide in the disk 6 an aperture such as a slot 7 which, as illustrated in Fig. 1a, may be of rectangular form having its principal dimension parallel to the base plate 1 of the guide. The slot 7 effects a concentration of the field intensity or potential incident to the electromagnetic field across the horizontal edges 8 and 9 thereof.

The principal dimension of the slot is perpendicular to the electric component of the electromagnetic wave which is transmitted through the guide. By virtue of the particular arrangement shown in explaining one application of our invention, an $H_{01}$ type wave will be transmitted along the axis of the guide. The electric component of the field is perpendicular to the base of the guide. It is to be understood that our invention may be applied with equal facility to other types of waves, such as E waves and H waves generally, wherein different forms of exciting means are employed for the guide to establish field waves of different patterns, in which cases the slot will be positioned and proportioned to be resonant to the frequency of the exciting waves.

Prior to an explanation of the manner in which the dimensions of the aperture of rectangular wave form may be computed, it is believed that it will be of advantage to review certain fundamental aspects relative to the characteristics of a rectangular wave guide. It has been established theoretically and experimentally that the frequency at which the guide is excited must be greater than the critical minimum or cut-off frequency. The frequency at which the cut-off occurs is a function of a number of factors including the field pattern of the wave to be transmitted, the dielectric constant of the medium within the guide, and the cross-sectional area of the guiding structure. So long as the exciting wave is maintained above the critical frequency or cut-off frequency of the guide, energy will be transmitted throughout the guide. The wave length of the wave transmitted through the guide is a function of the wave length of the exciting wave in free space and the dimensions of the rectangular guide. For example, in a rectangular air-filled wave guide of base $b$ and height $a$, the wave length $\lambda_g$ for an $H_{01}$ type wave may be expressed as follows:

$$\lambda g = \lambda \left[1 - \left(\frac{\lambda}{2b}\right)^2\right]^{-\frac{1}{2}} \quad (1)$$

where $\lambda$ is the wave length of the exciting wave in free space and where the electric component of the field is perpendicular to $b$.

The total impedance of a rectangular guide using air as the dielectric may be defined as follows:

$$Z_0 = \frac{V}{I} = \frac{E_0 \pi c}{2} \frac{\lambda g}{\lambda} \frac{a}{b} \quad (2)$$

where $E_0$ is the dielectric constant of air and where $c$ is the velocity of light. Of course, the total impedance may be characterized as the ratio of the applied voltage $V$ to the current $I$ which is transmitted through the guide. If this total guide impedance is constant along the guide, the wave will be propagated with no reflection. To maintain this impedance constant for changes in guide dimensions $a$ and $b$, one must have at any particular wave-length the following relationship:

$$\frac{a}{b}\lambda g = \text{constant} \equiv k \quad (3)$$

By substituting the value of $\lambda_g$ of Equation 1 into Equation 3, one finds that the rectangular guide will be of the same total impedance at any cross-section along its length for arbitrary changes in $a$ and $b$ provided $a$ and $b$ are related by:

$$\frac{b^2}{\left(\frac{\lambda}{2}\right)^2} - \frac{a^2}{\left(\frac{k}{2}\right)^2} = 1 \quad (4)$$

where $k$ is determined at any given wave-length and for a particular guide from Equation 3. Equation 4 repreesnts a rectangular hyperbola in the variables $$\frac{2b}{\lambda} \text{ and } \frac{2a}{k}$$

and is plotted as solid curves in Fig. 3, to be discussed presently.

Nothing has been said relative to the derivation of Equation 4 concerning the length of the wave guide for any section of constant $a$ and $b$, nor has any qualification been placed upon the effect of a sudden change in the values of $a$ or $b$, except by stating implicitly that the guided wave is an $H_{01}$ type wave. However, if the change in guide dimensions is made in a small fraction of a wave length, as shown in Fig. 2, there will be a reflection from the discontinuity so produced and the total impedances $Z_0$ and $Z_0'$ will be substantially equal. Experimentally, it is found that the reflection may be cancelled by the reflection from a similar discontinuity (though opposite in sense) a very short phase distance along the guide from the first discontinuity.

This is exactly what occurs in a rectangular resonant slot. The total impedance of the slot itself is the same as that of the guide, while the reflection produced at entrance of the slot is just canceled by the reflection from the exit.

Although the exit reflection from a slot placed at the end of the guide, as in Fig. 1, is not the same as the entrant reflection, it is still sufficiently near equality so that the reflection from the slot as a whole is essentially that from an ended guide.

In order to facilitate the computation of the length $l$ and the height $h$ of the rectangular slot in a wall member for a rectangular wave guide of particular values of $a$ and $b$, the rectangular hyperbola defined by Equation 4 may be plotted in the manner illustrated in Fig. 3 where the solid curves are the rectangular hyperbola plotted as functions of the quantities $$\frac{2a}{k} \text{ and } \frac{2b}{\lambda}$$

For a particular wave guide, these latter two quantities are known and it is possible to determine readily from the solid curves the dimensions $l$ and $h$ of the slot, as explained more fully in connection with Fig. 4 discussed hereinafter.

In Fig. 4. it will be observed relative to slots $h$—$l$, and $h'$—$l'$ that as the length $l$ of the slot is increased, the height $h$ is also increased. As the height $h$ approaches the zero value, the length $l$ approaches the limit $$\frac{\lambda}{2}$$

Relative to the mechanics of determining the dimensions of various resonant slots for a particular guide, two points may be located along a horizontal line bisecting the vertical dimension of the guide and parallel to the base. The dimension $$\frac{\lambda}{2}$$

is set off along this line and has a value which is one-half the wave length of the exciting source in the metal used in the wall. Each of the hyperbolas is then drawn through the three points comprising one of the two points located on the aforementioned horizontal line and the two corners of the wall member located on the same side of a vertical bisector of the guide as that one point. These three points are sufficient to determine the loci of the hyperbola, and consequently determine the corners of the rectangular slots for different values of $h$ and $l$. The exact values of $h$ and $l$ to be used in a particular structure depend upon the following general considerations. As the area of the resonant slot is decreased, the size of the source of radiation is decreased also, so that, as a limit, the resonant slot appears as a point source. It is apparent, therefore, that the width of the radiated beam varies directly with the dimensions of the resonant slot, a larger slot providing a wider beam of radiated energy. Since the values of $h$ and $l$, when the value of one of them is chosen, are mutually dependent, the radiation characteristic of a given system is determined by selection of either of these dimensions.

Figs. 5 and 6 may be referred to relative to the explanation of the manner in which a resonant aperture constructed in accordance with our invention, such as a rectangular slot or slit in the metallic wall, operates as a virtual dipole for radiative purposes. The explanation is concerned primarily with the system when it is operating to transmit a $H_{01}$ type wave and wherein an electric component E of the field is perpendicular to the base $b$. The wall member including the aperture is substantially reflectionless inasmuch as it is tuned in effect to the wave length $\lambda$ of the exciting waves for the guide. As a result, the potential of the impinging electromagnetic wave is concentrated between the horizontal dimensions, that is edges 8 and 9, of the slot. Accordingly, current flows along paths indicated by the dotted lines of Fig. 5. Of course, it is to be realized that during one-half cycle of the wave, current flows from the top to the bottom and during the following half cycle of the wave the current flows in the opposite direction. The current which flows due to the electric field comprises two components, one of which is the displacement current which follows by virtue of the effective capacitance between the edges 8 and 9, and the other component is a conduction current which flows around the edges of the slot. Due to the flow of this current, it will be readily appreciated that the effect thereof is to produce a virtual dipole whereby the energy of the electromagnetic waves may be effectively concentrated and radiated.

In Fig. 7, we have illustrated another modification of our invention wherein the aperture is of the configuration including a narrow slot $s$ terminating at either end in a circular opening. The principal capacitance of such an aperture is constituted by the horizontal parallel edges of the narrow slot $s$, and the principal inductance of the opening is furnished by the circular openings. In operation, the radiative element illustrated in Fig. 7 performs in substantially the same way as that explained above in connection with Fig. 5 to produce a virtual dipole for the effective concentration and transmission of radiant energy incident to the impinging wave. The dotted lines represent the current flow incident to the establishment of the electric field along the slot $s$.

If desired, the radiative element may assume the form illustrated in Fig. 8 wherein the aperture is circular. The wall including the aperture may be placed at the end of a circular or tubular dielectric wave guide. In this manner a dipole effect is also accomplished by the flow of current incident to the instantaneous difference of the potential due to the electric component of field and as represented by the dotted lines of Fig. 8.

It may be desirable in some arrangements utilizing our invention to position the wall including the aperture within the wave guide and at a short distance displaced from the end of the guide in order that the reflection due to the impinging wave be reduced to a negligible value. In this way, it will thus be seen that the characteristic impedances of the system on both sides of the wall may be made more nearly equal. Of course, it is to be appreciated that modifications of the apertures shown in Figs. 7 and 8 may also be incorporated in a system wherein the wall member is positioned a short distance from the end of the guide.

One of the factors which determines the width of a beam of an electromagnetic wave radiated from a surface is the size of the exciting source at the focal point. In accordance with another aspect of our invention, we utilize the narrowly defined region of radiation of the aperture by placing the aperture within the vicinity of, or in exact coincidence with, the focal point of a reflecting surface. For example, in Fig. 10 we have shown one way in which our invention may be applied to a system where it is desired to produce an evenly distributed and well defined radiated wave. The wave guide and associated radiative element shown in detail in Fig. 1 may be positioned relative to a reflecting surface such as a paraboloid 10. The paraboloid 10 may be constructed of any suitable material such as aluminum and by positioning it relative to the slot 7, the waves emanating from the slot 7 are reflected in a uniform pattern determined by the dimensions of the paraboloid 10. It is quite important that the dimensions of the paraboloid 10 be substantially greater than that of the wave guide in order that the energy reflected from the paraboloid 10 to the guide does not deleteriously affect the transmitting qualities of the system. Stated in other words, it is relatively important that the projected cross-sectional area of the guide upon the parabolic surface be relatively small compared with the total surface of the paraboloid. Although the following figures are not critical, the dimensions $c—d$ of the paraboloid may be 48 inches and the dimension $a$ of the guide may be 1½ inches. By maintaining a large ratio between the area of the paraboloid and the cross sectional area of the guide, the amount of energy which is reflected from the paraboloid to the guide will not interfere with the desired operation of the system. In order to obtain the most efficient utilization of the reflecting surface, the extremities of the parabolic surface may lie in the same vertical plane with the disk 6.

Fig. 11 illustrates an arrangement wherein the system of Fig. 10 may be provided with compensatory means for counteracting the effect of any energy which is reflected into the guide from the paraboloid 10. This means may comprise a reflecting means, such as a stub 11, positioned within the guide to reflect the reflected energy transmitted into the guide from the paraboloid 10. Suitable means for adjusting the position of the stub 11 to obtain the desired operation may be provided within the purview of our invention. For the purpose of illustration, the stub 11 has been shown as mounted on a slide 12 which may be positioned by a thumbscrew assembly 13.

Of course, it is to be realized that the presence of stub 11 in the guide necessarily causes a small amount of reflection of the electromagnetic wave which it is desired to propagate through the guide by virtue of the exciting impulses. By making the stub 11 relatively small in comparison to the other dimensions of the guide, the reflection of the original wave may be made negligible while at the same time serving as a means for neutralizing the reflected wave in the guide due to the paraboloid 10. Fig. 12 is a cross sectional view of Fig. 11 at A—A showing the position of the stub 11 in the base of the guide.

Where it is required to radiate relatively large amounts of power from the guide, it is desirable to insulate the radiative element, particularly the aperture, so that relatively large components of voltage may appear across the aperture without effecting a breakdown of the dielectric medium within the guide and slot. Accordingly, in Fig. 13 we represent diagrammatically an arrangement wherein a material 14 of high dielectric constant is placed around the wall member 15. This insulating material may be polystyrene, quartz, titanium dioxide, etc.

Although the configuration of the insulating material is not critical, it may be desired to form the insulating material so that it has a substantially circular cross sectional area, as illustrated in Fig. 13, in the radiative direction of the wave. On the impinging side of the wall 15, the dielectric material may be applied in sheet form having a rectangular cross sectional area as illustrated.

While we have shown and described our invention as applied to particular systems embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a hollow-pipe type wave guide for transmitting electromagnetic waves dielectrically, exciting means for establishing electromagnetic waves in said guide, and means including a wall member associated with said guide provided with an aperture tuned to the frequency of said exciting means and having an appreciable dimension perpendicular to a transverse component of electric field for effecting a concentration of the potential due to said waves and for effecting current flow in said wall member thereby producing in effect a dipole for radiation purposes.

2. In combination, a hollow-pipe type wave guide for transmitting electromagnetic waves dielectrically, exciting means for establishing electromagnetic waves in said guide, and a radiative wall member positioned relative to said guide in a plane perpendicular to the direction of propagation of the electromagnetic waves through said guide, said wall member being provided with an elongated aperture a principal dimension of which is perpendicular to the electric component of the electromagnetic waves and said aperture being tuned to the frequency of said exciting means.

3. In combination, a hollow-pipe type wave guide for transmitting electromagnetic waves dielectrically, said guide having an energy input end and an energy transmitting end, exciting means for establishing electromagnetic waves in said guide, and a radiative wall positioned a relatively short distance within said guide from the transmitting end of said guide and having therein an aperture tuned to the frequency of the exciting means for producing a concentration of the potential incident to the wave within said guide so that said aperture operates as a virtual dipole.

4. In combination, a hollow-pipe type wave guide for transmitting electromagnetic waves dielectrically, exciting means for establishing electromagnetic waves in said guide, and a wall member positioned relative to said guide to be substantially transverse to the direction of propagation of waves through said guide and having therein a tuned aperture comprising a central elongated slit and an enlarged opening at each end of the slit.

5. In combination, a hollow-pipe type wave guide for transmitting electromagnetic waves dielectrically, exciting means for establishing electromagnetic waves in said guide, and a metallic wall member associated with said guide and positioned transverse thereto relative to the direction of wave propagation through said guide and comprising an opening tuned to the frequency of the exciting means thereby effecting a concentration of the potential incident to the waves and for effecting current flow in the wall to produce in effect a dipole for radiation purposes.

6. In combination, a wave guide comprising essentially a pipe-like member, means connected to said member for establishing electromagnetic waves within said member, and a wall member substantially perpendicular to the longitudinal axis of the first mentioned member and having therein a slot which is tuned to the frequency of exciting electromagnetic waves to effect a concentration of one component of the electromagnetic field for producing a concentrated region of field intensity and thereby effecting a concentrated radiation of energy.

7. In combination, a dielectric guide comprising a pipe-like member, means connected to said member for establishing therein electromagnetic waves, and a radiative wall member substantially perpendicular to the longitudinal axis of said member and being provided with a slot tuned to the frequency of said waves for the purpose of effecting concentration of the electric component of the electromagnetic field across the edges of the slot.

8. In combination, a wave guide comprising a pipe-like member for propagating electromagnetic waves dielectrically and having a rectangular cross section, means connected to the top and bottom of said member for establishing electromagnetic waves therein, and a radiative metallic element substantially perpendicular to the direction of propagation of said waves and having therein a rectangular shaped slot tuned to the frequency of said waves for effecting concentration of the potential due to the electric component of the electromagnetic field.

9. In combination, a wave guide comprising a pipe-like member for transmitting electromagnetic waves dielectrically, exciting means for establishing within said member electromagnetic waves, a radiative wall member at one end of the first mentioned member and having therein a resonant slot tuned to said frequency of said exciting means for effecting concentration of a predetermined component of the electromagnetic field, and a reflector having a focal point within the vicinity of said slot for producing a directed electromagnetic wave of uniform distribution.

10. In combination, a wave guide comprising a pipe of rectangular cross section for transmitting electromagnetic waves dielectrically, exciting means connected to said pipe for establishing therein electromagnetic waves, a metallic disk abutting one end of said pipe and being provided with a resonant slot tuned to the frequency of said exciting means for effecting a concentration of a component of the electromagnetic field, a parabolic reflector positioned to have its focal point within the vicinity of said slot to produce a substantially even distribution of directed radiant energy within the region determined by said reflector.

11. In combination, a metallic pipe-shaped guide having a rectangular cross section for propagating electromagnetic waves dielectrically, exciting means for establishing within said pipe-like member electromagnetic waves, and a radiative wall substantially perpendicular to the direction of propagation of said waves and being provided with a rectangular shaped slot which is tuned to be resonant to the frequency of said exciting means.

12. In combination, a wave guide comprising a metallic pipe-like member for propagating electromagnetic waves dielectrically, exciting means for establishing electromagnetic waves within said member, a radiative element at one end of said member, said element being disposed in a plane which is substantially perpendicular to the longitudinal axis of said member and having a slot which is tuned to the frequency of said exciting means for effecting a concentration of the field gradient whereby said slot operates substantially as a dipole, and a paraboloid having its focus within the vicinity of said slot for reflecting the energy radiated from said slot.

13. In combination, a hollow-pipe type wave guide for transmitting electromagnetic waves dielectrically, exciting means for establishing electromagnetic waves in said guide, a wall member associated with said guide and lying in a plane having a component substantially perpendicular to the direction of wave propagation through said guide and being provided with an aperture tuned to the frequency of said exciting means, a surface positioned relative to said aperture for reflecting the energy emanating from said aperture, and means for substantially neutralizing the energy reflected between said guide and said surface.

14. In combination, a hollow-pipe type wave guide for transmitting electromagnetic waves dielectrically, said guide having an energy input end and an energy transmitting end, exciting means for establishing electromagnetic waves within said guide, a wall member positioned within the vicinity of the transmitting end of said guide and lying in a plane substantially perpendicular to the direction of wave propagation through said guide, said wall having an aperture tuned to the frequency of the exciting means for effecting concentration of the potential due to a predetermined component of the field within said guide thereby causing said aperture to operate as a virtual dipole, a surface positioned relative to said aperture for reflecting the energy radiated from said aperture, and means positioned within said guide for substantially neutralizing the energy reflected from said surface into said guide.

15. In combination, a hollow-pipe type wave guide for transmitting electromagnetic waves dielectrically, said guide having an energy input end and an energy transmitting end, exciting means for establishing electromagnetic waves within said guide, a wall member positioned within the vicinity of the transmitting end of said guide and lying in a plane substantially perpendicular to the direction of wave propagation through said guide, said wall having an aperture tuned to the frequency of the exciting means for effecting concentration of the potential due to a predetermined component of the field within said guide thereby causing said aperture to operate as a virtual dipole, a surface positioned relative to said aperture for reflecting the energy radiating from said aperture, a stub positioned within said guide for substantially neutralizing the energy reflected from said surface into said guide, and means for adjusting the position of said stub.

16. In combination, a hollow-pipe type wave guide for transmitting electromagnetic waves dielectrically, said guide having an energy input end and an energy transmitting end, exciting means for establishing electromagnetic waves within said guide, a wall member positioned within the region of the transmitting end of said guide and lying in a plane substantially perpendicular to the direction of wave propagation through said guide, said wall having an aperture tuned to the frequency of the exciting means for effecting concentration of the potential due to a predetermined component of the field within said guide thereby causing said aperture to operate as a virtual dipole, a surface positioned relative to said aperture for reflecting the energy radiating from said aperture, and a metallic stub positioned within said guide for substantially neutralizing the effect of said energy reflected from said surface into said guide.

17. In combination, a hollow-pipe type wave guide for transmitting electromagnetic waves dielectrically, exciting means for establishing electromagnet waves in said guide, means including a wall member associated with said guide provided with an aperture tuned to the frequency of said exciting means and having an appreciable dimension perpendicular to a transverse component of the electric field for effecting a concentration of the potential due to said waves and for effecting current flow in said wall member thereby producing in effect a dipole for radiation purposes, and a medium of substantial dielectric strength enclosing at least that portion of the wall member including the aperture.

18. In combination, a hollow-pipe type wave guide for transmitting electromagnetic waves dielectrically, exciting means for establishing electromagnetic waves in said guide, means including a wall member associated with said guide provided with an aperture tuned to the frequency of said exciting means and having an appreciable dimension perpendicular to a transverse component of the electric field for effecting a concentration of the potential due to said waves and for effecting current flow in said wall member thereby producing in effect a dipole for radiation purposes, and a solid dielectric material substantially surrounding said wall member.

19. In combination, a hollow-pipe type guide for transmitting electromagnetic waves dielectrically, exciting means for establishing electromagnetic waves in said guide, means including a wall member associated with said guide and provided with an aperture tuned to the frequency of said exciting means and having an appreciable dimension perpendicular to the transverse component of the electric field for effecting a concentration of the potential due to said waves and for effecting current flow in said wall member thereby producing in effect a dipole for radiation purposes, and a dielectric material of substantial dielectric strength substantially enclosing said wall member and having a substantially spherical curvature in the direction of wave propagation.

20. In combination, a hollow-pipe type guide for transmitting electromagnetic waves dielectrically, exciting means for establishing electromagnetic waves in said guide, means including a wall member associated with said guide and provided with an aperture tuned to the frequency of said exciting means and having an appreciable dimension perpendicular to the transverse component of the electric field for effecting a concentration of the potential due to said waves and for effecting current flow in said wall member thereby producing in effect a diode for radiation purposes, and a solid dielectric material covering said wall member on both the wave receiving and wave transmitting sides thereof and extending through said aperture to permit the establishment of high voltage gradients incident to said waves and thereby preventing breakdown of said aperture.

21. In combination, a hollow-pipe type guide for transmitting electromagnetic waves dielectrically, exciting means for establishing electromagnetic waves in said guide, and a wall member associated with said guide provided with an aperture the impedance of which is substantially the same as the impedance of said guide and having an appreciable dimension relative to a transverse component of electric field for effecting the concentration of the potential due to said waves and for effecting current flow in said wall member thereby producing in effect a dipole for radiation purposes.

22. In combination, a hollow-pipe type wave guide for transmitting electromagnetic waves dielectrically, exciting means for establishing electromagnetic waves in said guide, and means including a conductive member associated with said guide and provided with an aperture tuned to the frequency of said exciting means and having an appreciable dimension perpendicular to a transverse component of electric field for effecting a concentration of the potential due to said waves and for effecting current flow in said conductive member thereby producing in effect a dipole for radiation purposes, said conductive member having a phase extension in the direction of wave propagation within said wave guide which is a small portion of a wavelength of said waves.

MILAN D. FISKE.
JAMES M. LAFFERTY.

Disclaimer 2,407,068.—*Milan D. Fiske*, Schenectady, and *James M. Lafferty*, Colonie, N. Y. WAVE TRANSMITTING SYSTEM. Patent dated Sept. 3, 1946. Disclaimer filed June 14, 1951, by the assignee, *General Electric Company*.

Hereby enters this disclaimer to claims 1, 2, 4, 5, 6, 7, 11, 21, and 22 of said patent.

[*Official Gazette August 7, 1951.*]